United States Patent
Jarmon et al.

(10) Patent No.: US 10,464,850 B2
(45) Date of Patent: Nov. 5, 2019

(54) FILAMENT WINDING APPARATUS AND METHOD FOR CERAMIC MATRIX COMPOSITES

(71) Applicant: United Technologies Corporation, Hartford, CT (US)

(72) Inventors: David C. Jarmon, Kensington, CT (US); William K. Tredway, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 669 days.

(21) Appl. No.: 15/022,521

(22) PCT Filed: Sep. 9, 2014

(86) PCT No.: PCT/US2014/054786
§ 371 (c)(1),
(2) Date: Mar. 16, 2016

(87) PCT Pub. No.: WO2015/041899
PCT Pub. Date: Mar. 26, 2015

(65) Prior Publication Data
US 2016/0229756 A1    Aug. 11, 2016

Related U.S. Application Data

(60) Provisional application No. 61/879,905, filed on Sep. 19, 2013.

(51) Int. Cl.
*C04B 35/82*    (2006.01)
*C04B 37/00*    (2006.01)
(Continued)

(52) U.S. Cl.
CPC ............ *C04B 35/82* (2013.01); *B28B 1/42* (2013.01); *B28B 1/52* (2013.01); *C03C 14/002* (2013.01);
(Continued)

(58) Field of Classification Search
CPC .. B28B 1/42; B28B 1/52; C04B 35/82; C04B 37/00; C03C 14/002
See application file for complete search history.

(56) References Cited

U.S. PATENT DOCUMENTS 4,164,836 A    8/1979    Tanae et al.
4,220,497 A    9/1980    Carley
(Continued)

FOREIGN PATENT DOCUMENTS

GB    2075490 A    11/1981

OTHER PUBLICATIONS

Mark Van Roode, Mattison K. Farber, David W. Richerson, Ceramic Gas Turbine Design and Test Experience, Progress In Ceramic Gas Turbine Development, New York, vol. 1, ASME Press, 2002.
(Continued)

*Primary Examiner* — Nahida Sultana
*Assistant Examiner* — Debjani Roy
(74) *Attorney, Agent, or Firm* — Kinney & Lange, P.A.

(57) ABSTRACT

An apparatus for making a composite article includes a monofilament feed track adapted to carry a spaced array of ceramic monofilament strands, a fiber yarn feed track adapted to carry a spaced array of fiber yarn tows impregnated with a plurality of glass particulates, a mandrel, and a heater assembly. The mandrel is adapted to wind together individual glass-impregnated fiber yarn strands and individual ceramic monofilament strands to form a dual-fiber weave. The heater assembly is adapted to heat at least the glass particulates such that pressure from the wound array of
(Continued)

ceramic monofilaments is sufficient to consolidate the glass particulates and the dual-fiber weave into a dual-fiber ceramic matrix composite (CMC).

9 Claims, 3 Drawing Sheets

(51) Int. Cl.
    *B28B 1/42*    (2006.01)
    *B28B 1/52*    (2006.01)
    *C03C 14/00*    (2006.01)
    *C03B 23/00*    (2006.01)

(52) U.S. Cl.
    CPC ........ *C03B 23/006* (2013.01); *C03C 2214/02* (2013.01); *C03C 2214/30* (2013.01)

(56) References Cited

U.S. PATENT DOCUMENTS

| | | | |
|---|---|---|---|
| 4,704,332 A | 11/1987 | Brennan et al. | |
| 4,808,076 A | 2/1989 | Jarmon et al. | |
| 4,909,872 A | 3/1990 | Jarmon | |
| 4,960,451 A | 10/1990 | Malinoski et al. | |
| 4,960,629 A | 10/1990 | Jarmon et al. | |
| 4,976,761 A | 12/1990 | Allaire | |
| 5,503,928 A * | 4/1996 | Cheshire | B29C 53/8016 264/121 |
| 5,639,337 A | 6/1997 | Darrieux et al. | |
| 8,632,847 B2 * | 1/2014 | Pacetti | A61L 31/06 427/2.25 |
| 8,741,201 B2 * | 6/2014 | Huang | A61F 2/90 264/322 |
| 9,409,347 B2 * | 8/2016 | Nelson | B29C 70/081 |
| 2002/0082378 A1 * | 6/2002 | Pope | C08G 77/60 528/25 |
| 2006/0043628 A1 | 3/2006 | Matsumoto | |
| 2007/0099527 A1 | 5/2007 | Brun et al. | |

OTHER PUBLICATIONS

Fabrizio Quadrini, Erica Anna Squeo, Claudia Prosperi, Diode Laser Assisted Filament Winding of Thermoplastic Matrix Composites, ISSN 1996-1944, Materials, 2010, 3, 563-571.

Weixue Tian, Wilson K.S. Chiu, Temperature Prediction for $CO_2$ Laser Heating of Moving Glass Rods, Optics & Laser Technology, 36 (2004) 131-137.

Alexander Streltsov, James Dickinson, Richard Grzybowski, Daniel Harvey, Stephan Logunov, Alper Ozturk, James Sutherland, Marcel Potuzak, Laser Texturing of Doped Borosilicate Glasses, proc of SPIE, vol. 7584 7584OPS-1.

International Search Report and Written Opinion from PCT Application Serial No. PCT/US2014/054786, dated Dec. 16, 2014, 8 pages.

Extended European Search Report for EP Application No. 14845359.0, dated Apr. 4, 2017, 8 pages.

\* cited by examiner

FILAMENT WINDING APPARATUS AND METHOD FOR CERAMIC MATRIX COMPOSITES

BACKGROUND

The described subject matter relates generally to composite materials and more specifically to methods for manufacturing composite materials.

Because of their high thermal and mechanical performance and relatively low density, numerous cylindrical or ring-shaped components could benefit from the use of Ceramic Matrix Composites (CMCs) in place of metals or intermetallics. The high production cost of current CMCs, and particularly high-density dual-fiber CMCs results in part from multiple long processing cycles to achieve sufficient densification. This has severely limited adoption of temperature resistant CMCs in gas turbine and hypersonic engines.

Currently, two of the primary cost-effective methods of processing dual-fiber hot section ceramic matrix composite (CMC) components are chemical vapor infiltration (CVI) and polymer infiltration and pyrolysis (PIP), either of which can take 20 days or longer to reach "full" consolidation. Another process is glass transfer molding, which is faster than CVI and PIP, but is also much more expensive and resource intensive.

SUMMARY

An apparatus for making a composite article includes a monofilament feed track adapted to carry a spaced array of ceramic monofilament strands, a fiber yarn feed track adapted to carry a spaced array of fiber yarn tows impregnated with a plurality of glass particulates, a mandrel, and a heater assembly. The mandrel is disposed at an end of the monofilament feed track and an end of the fiber yarn feed track. The mandrel is adapted to wind together individual ones of the spaced array of glass-impregnated fiber yarn tows and individual ones of the array of ceramic monofilament strands to form a dual-fiber weave. The heater assembly is disposed within or adjacent to the mandrel and is adapted to heat at least the glass particulates such that pressure from the wound array of glass monofilaments is sufficient to consolidate the glass particulates and the dual-fiber weave into a dual-fiber ceramic matrix composite (CMC).

A method for making a composite article includes collimating and tensioning a plurality of ceramic monofilaments into a spaced array of ceramic monofilament strands. The first spaced array of ceramic monofilament strands are commingled with a second array of fiber yarn tows, at least some of which are impregnated with a plurality of glass particulates. The commingled first array of ceramic monofilament strands and second array of fiber yarn tows are heated, thereby softening the plurality of glass particulates. The commingled glass monofilament strands and impregnated fiber yarn tows are wound onto a mandrel. The softened glass particulates, the fiber yarn tows, and the monofilament strands are consolidated into a dual-fiber ceramic matrix composite (CMC) material.

DETAILED DESCRIPTION

Figure 1:
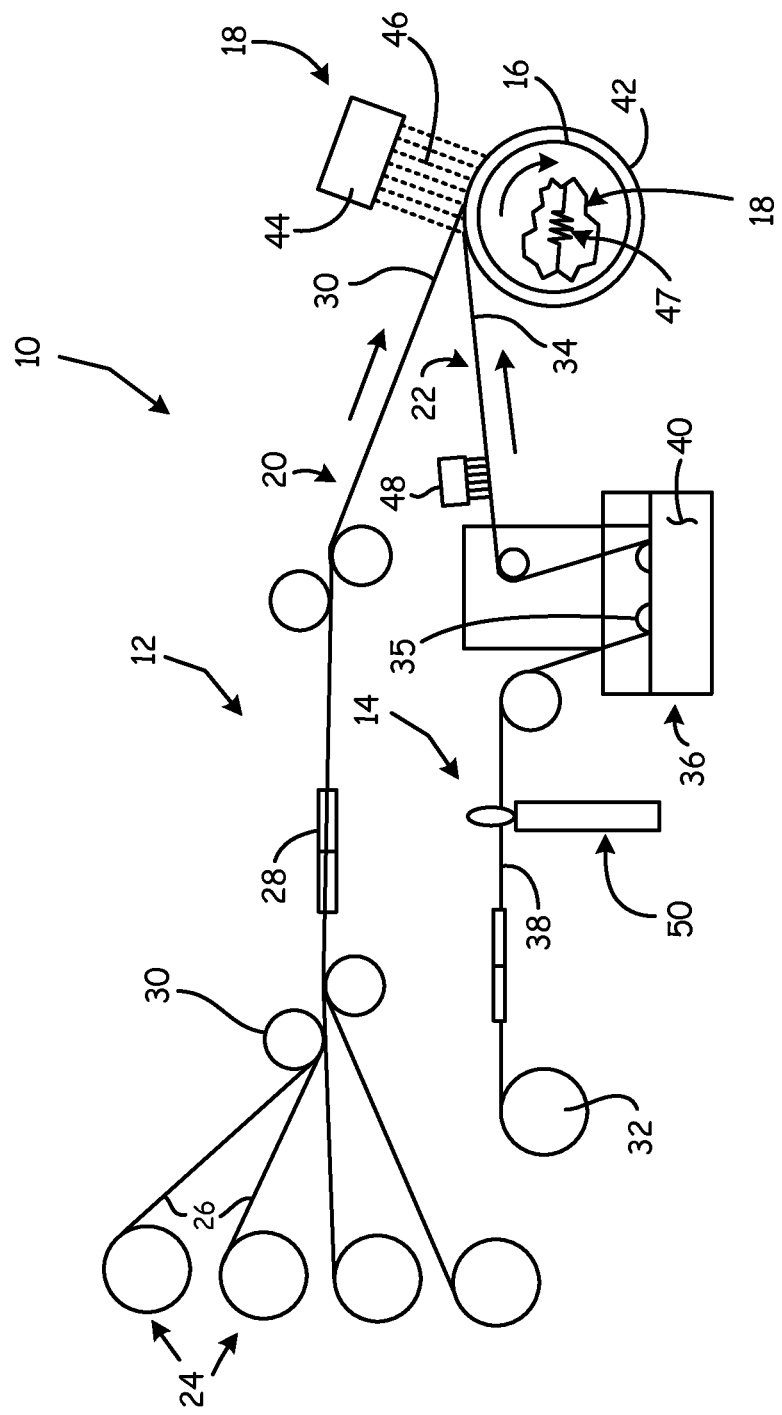
FIG. 1 shows an apparatus for making a dual-fiber ceramic matrix composite (CMC) article.

FIG. 1 shows filament winding apparatus 10 for making a composite article. Apparatus 10 generally includes monofilament feed track 12, fiber yarn feed track 14, mandrel 16, and heater assembly 18. Monofilament feed track 12 is adapted to arrange and carry array 20 of spaced ceramic monofilaments, while fiber yarn feed track 12 is adapted to arrange and carry array 22 of spaced fiber yarn tows.

Monofilament feed track 12 has one or more monofilament spools 24 having a corresponding plurality of ceramic monofilaments 26 being fed to mandrel 16. Each monofilament spool 24 can be provided with an individual tensioning device (not shown). Collimator 28 is adapted to receive unspooled ones of ceramic monofilament strands 26 from corresponding monofilament spools 24 (via pulleys 30) by separating unspooled monofilaments 26 into array 20 of spaced ceramic monofilament strands (best shown in FIG. 2A). Collimator 28 can be disposed along monofilament feed track 12 between the plurality of monofilament spools 24 and mandrel 16.

In FIG. 1, fiber yarn feed track 14 includes a plurality of fiber yarn spools 32 having a corresponding plurality of fiber yarn strands 38 also being directed carried toward mandrel 16. Fiber yarn strands 38 can be multifilament yarn strands which are impregnated with a plurality of glass particulates to form impregnated fiber yarn tows 34 (best shown in FIG. 2B). Slurry tank 36, disposed along fiber yarn feed track 14 between fiber yarn spools 32 and mandrel 16, can be adapted to receive unspooled fiber yarn strands 38 from fiber yarn spools 32. Pulleys 35 can guide strands 38 into and out of slurry tank 36.

Slurry tank 36 can contain solution 40 for impregnating unspooled fiber yarn strands 34. Solution 40 can include a plurality of glass particulates and a binder suspended in a carrier liquid, resulting in impregnated fiber yarn tows 34 being fed to mandrel 16. Fiber yarn strands 38 can include multifilament yarns composed of one or more of silicon carbide (SiC) fiber yarn strands, carbon fiber yarn strands, or mixtures thereof. Fiber yarn strands 38 are under light or no tension so that they can pick up glass particulates when pulled through solution 40 in tank 36. The plurality of glass particulates can include at least one of: borosilicate glass particles, lithium aluminosilicate glass particles, barium magnesium aluminosilicate glass particles, and mixtures thereof. The binder can be, for example, organic or inorganic, such as colloidal silica. The carrier liquid can be water or an aqueous composition.

After arranging monofilaments 26 and impregnated fiber yarn tows 34 into respective arrays 20, 22, mandrel 16 can be adapted to wind together individual spaced ones of ceramic monofilament strands 26 and fiber yarn tows 34 to form a commingled fiber bundle. Mandrel 16 can be disposed at an end of monofilament feed track 12 and an end of fiber yarn feed track 14. Array 20 of monofilament fibers are under high tension and lie down on top of array 22 of impregnated yarn tows 34 as both arrays 20, 22 are wound onto rotating mandrel 16.

The dual-fiber weave is heated by heater assembly 18, and consolidated on mandrel 16 to produce dual-fiber ceramic matrix composite (CMC) ring 42. Heater assembly 18 is disposed within or adjacent to the mandrel 16, and is adapted to heat at least impregnated fiber yarn tows 34. The degree of heating is such that the glass particulates (shown in FIG. 2B) are softened, and thus respond to pressure from the wound array of ceramic monofilament strands 26. Glass monofilament strands 26 can be tensioned by individual monofilament spools 24, which provides consolidation pressure to form dual-fiber CMC ring 42.

Dual-fiber CMC ring 42 can form at least a portion of a turbine engine component. Example components include a fan containment case, a compressor shroud liner, combustor liners and heat shields, turbine support rings, nozzle seals, and acoustic liners. In combination with monolithic ceramics, dual-fiber CMC ring 42 can also be used in production of lightweight curved armor for military and aerospace applications.

In certain embodiments, heater assembly 18 includes energy beam generator 44 disposed adjacent to mandrel 16. Energy beam generator (e.g., laser generator) 44 is adapted to direct at least one beam 46 toward fiber yarn feed track 14, and more specifically, toward impregnated fiber yarn tows 34. Heater assembly 46 can include, additionally and/or alternatively, resistance heater 47 disposed within mandrel 16. This is shown schematically as a cutaway into mandrel 16.

To further facilitate formation of CMC ring 42, apparatus 10 can include additional optional elements such as dryer 48 and/or burnoff unit 50. Dryer 48, which can be a heat lamp or other apparatus maintained separately from heater assembly 46, can remove excess slurry liquid from impregnated fiber yarn tows 34 prior to being wound on mandrel 16. Dryer 48 also provides heat to bond the glass particulates to each of the fiber yarn strands 38. Burnoff unit 50 can be adapted to burn off ancillary fiber sizing which the fiber manufacturer often applies to the fiber yarn strands 38 to simplify handling. Burnoff unit 50 can be a controlled flame or a furnace. Removal of the ancillary fiber sizing aids in producing a dual-fiber composite with long term durability.

Figure 2A:
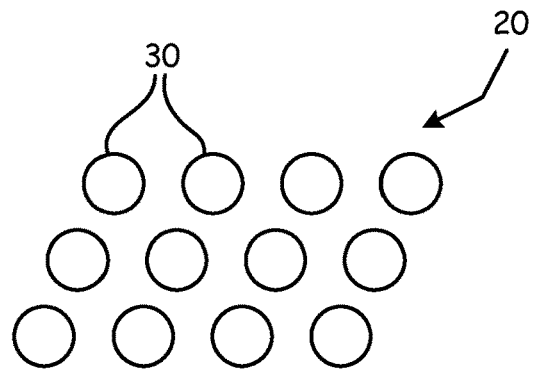
FIG. 2A depicts an array of monofilament strands.

FIG. 2A shows array 20 of spaced ceramic monofilament strands 26. As noted with respect to FIG. 1, monofilament array 20 provides both consolidation pressure for dual-fiber CMC ring 42, as well as excellent mechanical properties for aircraft and armor applications. Strands 26 can include, for example, a plurality of silicon carbide (SiC) monofilament strands.

A nominal diameter of each of the ceramic monofilament strands measures at least about 100 μm (about 0.0040 inches). Individually tensioned monofilaments 26 can generate pressures of at least about 430 MPa (about 60 ksi) as they are pulled on to the rotating mandrel, which is sufficient to consolidated selected dual-fiber glass composites such as dual-fiber CMC ring 42 (shown in FIG. 1). In certain embodiments, tensioned monofilaments 26 can generate pressures of at least about 570 MPa (about 80 ksi).

Multiple spools of individually tensioned monofilaments 26 can be provided. The relative number of tensioned monofilaments 26 and corresponding monofilament spools 24 (shown in FIG. 1) is adjusted to achieve the desired volume percent of monofilament fibers in dual-fiber CMC ring 42. In certain embodiments, the volume percent of monofilament fibers in the resultant CMC is in the range of about 30% to about 50%. In certain of these embodiments, the volume percent of monofilament fibers in the resultant CMC is in the range of about 35% to about 45%. The individual monofilaments can be collimated horizontally (via collimator 16 in FIG. 1) prior to winding on mandrel 16 (also in FIG. 1).

Figure 2B:
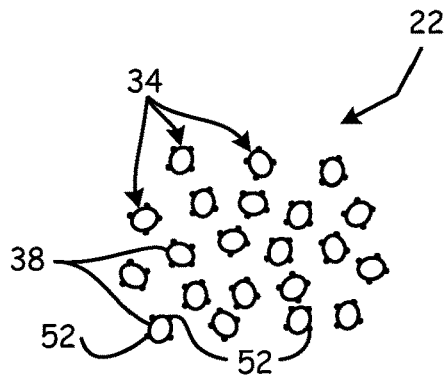
FIG. 2B depicts an array of impregnated fiber yarn tows.

FIG. 2B shows array 22 of impregnated fiber yarn tows 34. As shown in FIG. 1, glass particulates can be combined with multifilament yarn fiber strands 38 along fiber yarn track 14. Yarn fiber strands 38 can be pulled by rotating mandrel 16 through a slurry (e.g., solution 40 in FIG. 1) containing glass particulates, water, and a binder. As long as they remain under low or no tension, fiber filaments in strands 34 can spread as they travel through the slurry which allows glass particulates 52 to distribute evenly. If the yarn is under high tension, it will be pulled into a tight circular tow which will be difficult for the glass particulates to penetrate. There is also a danger of yarn fiber strands 38 breaking under high tension, especially if glass particulates produce point contact traveling over pulleys.

In certain embodiments, a typical size distribution for the glass particulates is a nominal 325 mesh. The binder can be organic or inorganic. Inorganic binders do not leave a carbon residue. A suitable, nonlimiting example of an inorganic binder is Ludox® AS-40 colloidal silica, available commercially from Sigma-Aldrich Company.

After exiting this slurry the yarn passes under a heat lamp to remove the water and the glass particulates bonded to the individual fiber filaments by the binder. The concentration of glass particulate in the slurry is adjusted to achieve the desired volume percent of glass in the resultant composite. The desired volume percent of glass in the resultant CMC is typically in the range of 35% to 45%.

Figure 2C:
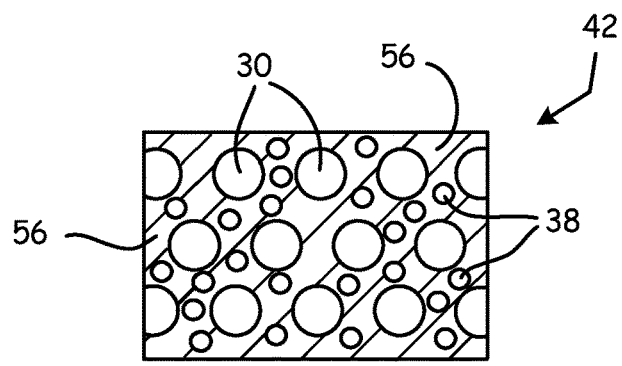
FIG. 2C depicts a consolidated dual-fiber CMC article formed using the apparatus of FIG. 1

FIG. 2C shows a section of consolidated dual-fiber CMC ring 42. Heat is supplied to glass particulates (in FIG. 2B) to lower their viscosity. Heat is applied to a point where the pressure from the monofilament fiber is able to consolidate the glass, yarn, and monofilament into a dense dual fiber reinforced CMC which includes monofilaments 26, and fiber yarn strands 38 retained in glass matrix 56.

It can be seen in FIG. 2C that there are substantially more fiber yarn tows than glass monofilament strands. A ratio of glass monofilament strands to fiber yarn tows can be at least about 8:1. In certain embodiments, the ratio can be at least about 10:1.

Figure 3:
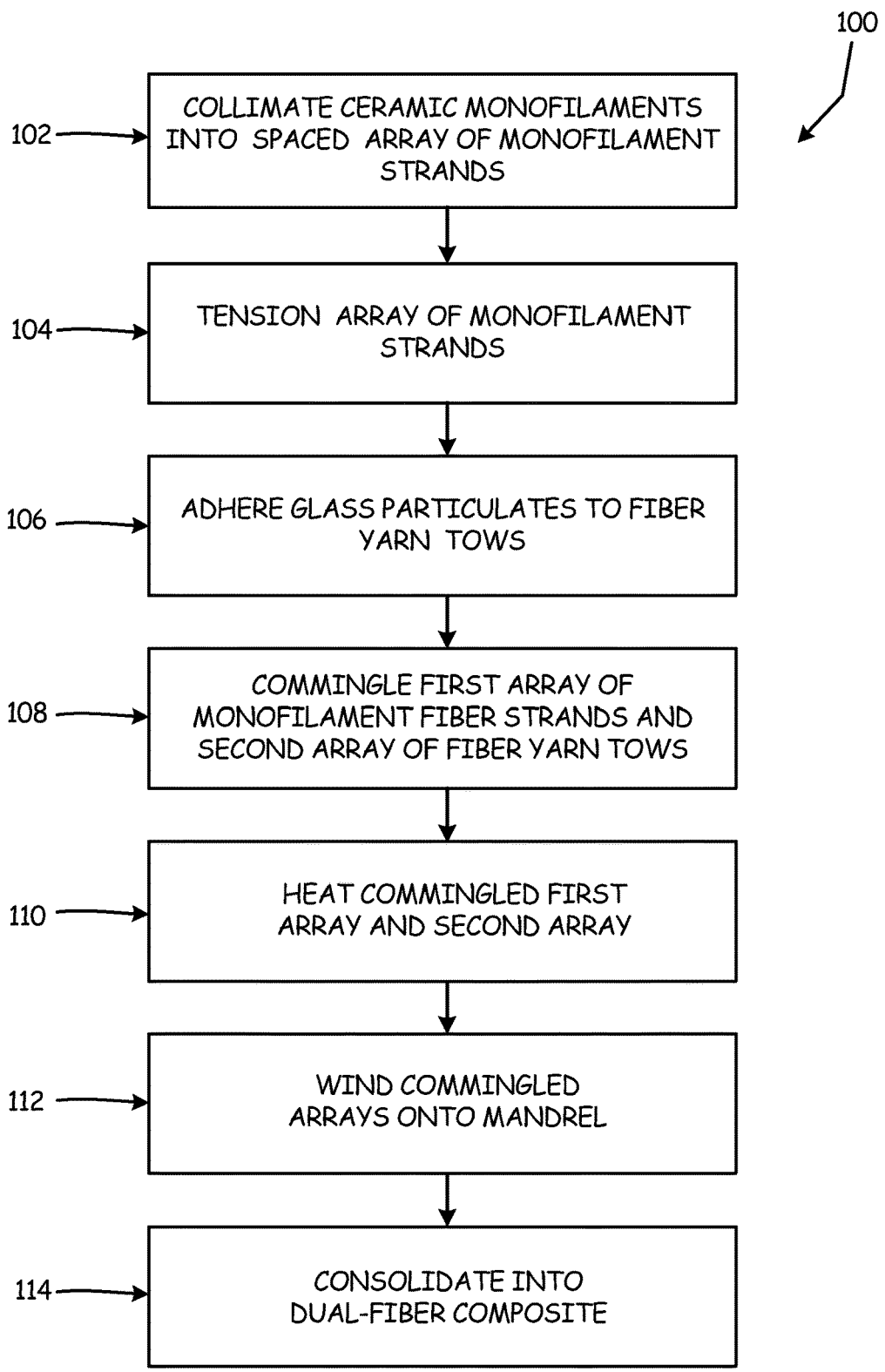
FIG. 3 is a flow chart of a method for making a dual-fiber CMC article.

FIG. 3 shows steps of method 100 for making a composite article such as dual fiber reinforced CMC ring 42 (shown in FIG. 1). This is a potential economical method of fabricating cylindrical/ring shaped CMC structures for engine components, such as for combustor liners, shrouds, containment rings, etc.

Method 100 begins with step 102 in which a plurality of ceramic monofilaments are collimated into a spaced array of glass monofilament strands. In certain embodiments, the ceramic monofilaments include silicon carbide (SiC) glass monofilaments.

Monofilaments can be provided with a diameter of at least about 100 μm (about 0.0040 inch), and in certain embodiments, at least about 140 μm (about 0.0056 inch). As discussed above, individually tensioned monofilaments can generate pressures of at least about 430 MPa (about 60 ksi) as it is pulled on to the rotating mandrel which is sufficient to consolidated selected fiber reinforced glass composites. One suitable non-limiting example of SiC monofilaments is SCS-6 SiC monofilament, available commercially from Specialty Materials, Inc. of Lowell, Mass.

The number of spools is adjusted to achieve the desired volume percent to monofilament fibers in the resultant composite. The desired volume percent of monofilament fibers in the resultant CMC is typically in the range of 35% to 45%. Each spool of monofilament fiber has an individual tensioning device. Typical devices will be able to control the monofilament tension from 10 grams to 1100 grams of force.

The individual monofilaments are collimated prior to winding on the mandrel. A typical or average spacing for the monofilament can be about 0.178 mm (about 0.007 in).+/- about 0.051 mm (about 0.002 in)

At step 104, the spaced array of ceramic monofilament strands are tensioned. This can be done in conjunction with or separately from collimating step 102. Tensioning the ceramic monofilament strands provides consolidation pressure to the heated and impregnated fiber yarn tows of step 114, below.

Optional step 106 involves adhering a plurality of glass particulates to at least some of the plurality of fiber yarn tows. In certain optional embodiments, some or all of the unspooled fiber yarn strands are impregnated with glass particulates as was shown in FIG. 1. Thus adhering step 106 can include passing at least some of the plurality of fiber yarn tows through a slurry of glass particulates and carrier liquid and evaporating the carrier liquid from the fiber yarn tows to form the array of fiber yarn tows. In lieu of step 106, some or all of the fiber yarn tows can be impregnated with glass particulates separately from embodiments of method 100.

Step 108 includes the interleaving or commingling of monofilament fibers strands and glass particulate impregnated yarn strands. And as part of step 108, the array of glass monofilament strands and the array of impregnated fiber yarn tows are commingled with one another to form a dual-fiber weave.

Step 110 can include heating the commingled first and second arrays of monofilament fibers strands and glass particulate impregnated yarn strands. At least some of the fiber yarn tows are impregnated with a plurality of glass particulates. The array of fiber yarn tows can be heated (step 110) prior to the winding step (step 112 below) by directing an energy beam toward the plurality of fiber yarn tows to soften the plurality of glass particulates. Alternatively the step of heating the array of fiber yarn tows comprises during the winding step 112, heating a surface on or adjacent to the mandrel to soften the plurality of glass particulates.

At step 112, the commingled arrays of glass monofilament strands and impregnated fiber yarn tows are wound onto a mandrel, while step 114 involves consolidating the glass particulates, the fiber yarn tows, and the monofilament strands into a dual-fiber ceramic matrix composite (CMC) material. Pressure from the tensioned array of monofilament strands (step 104) can act on the fiber yarn tows and the softened glass particulates (step 110). In certain embodiments, this pressure is sufficient to, at least in part, perform consolidating step 114. In certain of these embodiments, the ceramic monofilament strands can apply a pressure of at least about 430 MPa (about 60 ksi) to the array of fiber yarn tows and softened glass particulates. In yet certain of these embodiments, the glass monofilament strands apply a pressure of at least about 570 MPa (about 80 ksi) to the array of fiber yarn tows and softened glass particulates.

Discussion of Possible Embodiments

The following are non-exclusive descriptions of possible embodiments of the present invention.

An apparatus for making a composite article includes a monofilament feed track adapted to carry a spaced array of ceramic monofilament strands, a fiber yarn feed track adapted to carry a spaced array of fiber yarn tows impregnated with a plurality of glass particulates, a mandrel, and a heater assembly.

The apparatus of the preceding paragraph can optionally include, additionally and/or alternatively, any one or more of the following features, configurations and/or additional components:

An apparatus according to an exemplary embodiment of this disclosure, among other possible things, includes the mandrel disposed at an end of the monofilament feed track and an end of the fiber yarn feed track. The mandrel is adapted to wind together individual ones of the spaced array of glass-impregnated fiber yarn tows and individual ones of the array of ceramic monofilament strands to form a dual-fiber weave. The heater assembly is disposed within or adjacent to the mandrel and is adapted to heat at least the glass particulates such that pressure from the wound array of glass monofilaments is sufficient to consolidate the glass particulates and the dual-fiber weave into a dual-fiber ceramic matrix composite (CMC).

A further embodiment of the foregoing apparatus, wherein the monofilament feed track comprises a plurality of monofilament spools having a corresponding plurality of ceramic monofilament strands; and a collimator disposed along the monofilament feed track between the plurality of monofilament spools and the mandrel.

A further embodiment of any of the foregoing apparatus, wherein the collimator is adapted to receive unspooled ones of the plurality of ceramic monofilament strands from the plurality of corresponding monofilament spools, and to separate the unspooled ones into the first spaced array of ceramic monofilament strands.

A further embodiment of any of the foregoing apparatus, wherein the plurality of ceramic monofilament strands comprises a plurality of silicon carbide (SiC) ceramic monofilament strands.

A further embodiment of any of the foregoing apparatus, wherein the fiber yarn feed track comprises a plurality of fiber yarn spools having a corresponding plurality of fiber yarn tows; and a slurry tank disposed along the fiber yarn feed track between the plurality of fiber yarn spools and the mandrel.

A further embodiment of any of the foregoing apparatus, wherein the slurry tank is adapted to receive unspooled ones of the plurality of fiber yarn strands from the plurality of corresponding fiber yarn spools, and to impregnate the unspooled ones with a plurality of glass particulates contained in the slurry tank.

A further embodiment of any of the foregoing apparatus, wherein the plurality of fiber yarn tows comprises at least one of: a plurality of silicon carbide (SiC) fiber yarn strands, a plurality of carbon fiber yarn strands, or mixtures thereof.

A further embodiment of any of the foregoing apparatus, wherein the slurry tank contains a slurry comprising a plurality of glass particulates and a binder suspended in a carrier liquid.

A further embodiment of any of the foregoing apparatus, wherein the plurality of glass particulates comprises at least one of: borosilicate glass particles, lithium aluminosilicate glass particles, barium magnesium aluminosilicate particles, and mixtures thereof.

A further embodiment of any of the foregoing apparatus, wherein the heater assembly comprises a resistance heater disposed within the mandrel.

A further embodiment of any of the foregoing apparatus, wherein the heater assembly comprises an energy beam generator disposed adjacent to the mandrel, the energy beam generator adapted to direct at least one energy beam toward the fiber yarn feed track.

A method for making a composite article includes collimating and tensioning a plurality of ceramic monofilaments into a spaced array of ceramic monofilament strands.

The method of the preceding paragraph can optionally include, additionally and/or alternatively, any one or more of the following features, configurations and/or additional components:

A method according to an exemplary embodiment of this disclosure, among other possible things, includes the first spaced array of ceramic monofilament strands commingled with a second array of fiber yarn tows, at least some of which are impregnated with a plurality of glass particulates. The commingled first array of ceramic monofilament strands and second array of fiber yarn tows are heated, thereby softening the plurality of glass particulates. The commingled ceramic monofilament strands and glass particle impregnated fiber yarn tows are wound onto a mandrel. The softened glass particulates, the fiber yarn tows, and the monofilament strands are consolidated into a dual-fiber ceramic matrix composite (CMC) material.

A further embodiment of the foregoing method, wherein the consolidation step is performed at least in part by pressure from the tensioned array of monofilament strands acting on the fiber yarn tows and the softened glass particulates.

A further embodiment of any of the foregoing methods, further comprising adhering a plurality of glass particulates to form at least some of the plurality of impregnated fiber yarn tows.

A further embodiment of any of the foregoing methods, wherein the adhering step comprises passing at least some of the plurality of fiber yarn tows through a slurry of glass particulates and carrier liquid; and evaporating the carrier liquid from the fiber yarn tows to form the plurality of impregnated fiber yarn tows.

A further embodiment of any of the foregoing methods, wherein the step of heating the array of fiber yarn tows comprises, prior to the winding step, directing an energy beam toward the plurality of fiber yarn tows to soften the plurality of glass particulates.

A further embodiment of any of the foregoing methods, wherein the step of heating the array of fiber yarn tows comprises during the winding step, heating a surface on or adjacent to the mandrel to soften the plurality of glass particulates.

A further embodiment of any of the foregoing methods, wherein the plurality of ceramic monofilaments comprises a plurality of silicon carbide (SiC) glass monofilaments.

A further embodiment of any of the foregoing methods, wherein the plurality of glass particulates comprises borosilicate glass particles, lithium aluminosilicate glass particles, barium magnesium aluminosilicate particles, and mixtures thereof.

A further embodiment of any of the foregoing methods, wherein during at least one of the winding step and the consolidating step, the plurality of tensioned monofilament strands apply a pressure of at least about 550 MPa (about 80 ksi) to the fiber yarn tows and the softened glass particulates.

A further embodiment of any of the foregoing methods, wherein a nominal diameter of each of the ceramic monofilament strands measures at least about 100 μm (about 0.0040 inches).

A further embodiment of any of the foregoing methods, wherein a ratio of ceramic monofilament strands to fiber yarn tows is at least about 8:1.

A further embodiment of any of the foregoing methods, wherein the ratio of ceramic monofilament strands to fiber yarn tows is at least about 10:1.

Although the present invention has been described with reference to preferred embodiments, workers skilled in the art will recognize that changes may be made in form and detail without departing from the spirit and scope of the invention.

The invention claimed is:

1. An apparatus for making a composite article, the apparatus comprising:
   a monofilament feed track adapted to carry a first spaced array of ceramic monofilament strands;
   a fiber yarn feed track adapted to carry a second spaced array of fiber yarn tows impregnated with a plurality of glass particulates;
   a mandrel disposed at an end of the monofilament feed track and an end of the fiber yarn feed track, the mandrel adapted to wind together individual tows of the first spaced array of glass-impregnated fiber yarn tows and individual strands of the array of ceramic monofilament strands to form a dual-fiber weave; and
   a heater assembly disposed within or adjacent to the mandrel, the heater assembly adapted to heat at least the glass particulates such that pressure from the wound array of ceramic monofilaments is sufficient to consolidate the glass particulates and the dual-fiber weave into a dual-fiber ceramic matrix composite (CMC);
   wherein the monofilament feed track comprises:
      a plurality of monofilament spools configured to provide a first tension of at least 430 MPa to each of a corresponding plurality of ceramic monofilament strands on each spool; and
      a collimator disposed along the monofilament feed track between the plurality of monofilament spools and the mandrel; and
   wherein the fiber yarn feed track comprises:
      a plurality of fiber yarn spools having a corresponding plurality of fiber yarn tows; and
      a slurry tank disposed along the fiber yarn feed track between the plurality of fiber yarn spools and the mandrel;
         wherein the slurry tank is adapted to receive only unspooled ones of the fiber yarn strands at a second tension less than the first tension.

2. The apparatus of claim 1, wherein the collimator is adapted to receive unspooled ones of the plurality of ceramic monofilament strands from the plurality of corresponding monofilament spools, and to separate the unspooled ones into the first spaced array of ceramic monofilament strands.

3. The apparatus of claim 1, wherein the plurality of ceramic monofilament strands comprises a plurality of silicon carbide (SiC) ceramic monofilament strands.

4. The apparatus of claim 1, wherein the slurry tank is adapted to receive the unspooled ones of the plurality of fiber yarn strands from the plurality of corresponding fiber yarn spools, and to impregnate the unspooled ones with a plurality of glass particulates contained in the slurry tank.

5. The apparatus of claim 1, wherein the plurality of fiber yarn tows comprises at least one of: a plurality of silicon carbide (SiC) fiber yarn strands, a plurality of carbon fiber yarn strands, or mixtures thereof.

6. The apparatus of claim 1, wherein the slurry tank contains a slurry comprising a plurality of glass particulates and a binder suspended in a carrier liquid.

7. The apparatus of claim 6, wherein the plurality of glass particulates comprises at least one of: borosilicate glass particles, lithium aluminosilicate glass particles, barium magnesium aluminosilicate particles, and mixtures thereof.

8. The apparatus of claim 1, wherein the heater assembly comprises:
   a resistance heater disposed within the mandrel.

9. The apparatus of claim 1, wherein the heater assembly comprises:
   an energy beam generator disposed adjacent to the mandrel, the energy beam generator adapted to direct at least one energy beam toward the fiber yarn feed track.

\* \* \* \* \*